No. 742,329. PATENTED OCT. 27, 1903.
G. JOHNSTON.
SIGHT TESTING APPARATUS.
APPLICATION FILED OCT. 9, 1902.
NO MODEL.
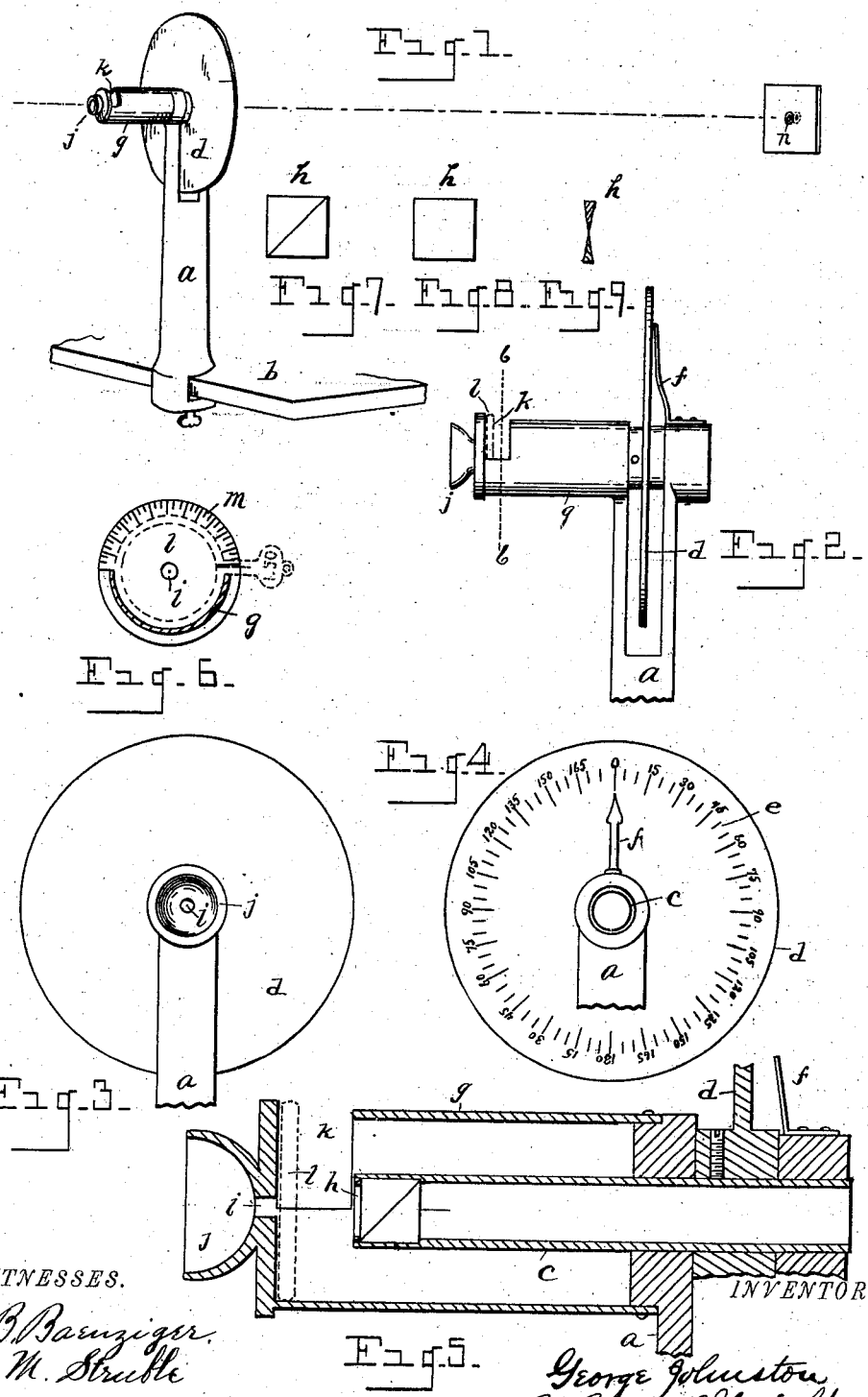

No. 742,329. Patented October 27, 1903.

UNITED STATES PATENT OFFICE.

GEORGE JOHNSTON, OF DETROIT, MICHIGAN.

SIGHT-TESTING APPARATUS.

SPECIFICATION forming part of Letters Patent No. 742,329, dated October 27, 1903.

Application filed October 9, 1902. Serial No. 126,424. (No model.)

*To all whom it may concern:*

Be it known that I, GEORGE JOHNSTON, a citizen of the United States, residing at Detroit, county of Wayne, State of Michigan, have invented a certain new and useful Improvement in Sight-Testing Apparatus, of which the following is a specification, reference being had to the accompanying drawings, which form a part of this specification.

My invention has for its object what I term a "sight-testing apparatus," an instrument for correcting all errors of refraction in testing the eyes and fitting glasses therefor.

My invention consists of the construction, combination, and arrangement of devices hereinafter described and claimed, and illustrated in the accompanying drawings, in which—

Figure 1 is a view in perspective, illustrating my invention and showing a suitable object which when viewed through the instrument is duplicated to the sight. Fig. 2 is a partial view of the instrument in side elevation. Fig. 3 is a partial front elevation. Fig. 4 is a partial rear elevation. Fig. 5 is a view in a vertical section through portions of the device. Fig. 6 is a section on the line 6 6, Fig. 2. Fig. 7 is a side view of a birefringent prism. Fig. 8 is a front view of the same. Fig. 9 is a section of double prisms having their apexes together, showing other forms of prisms.

The purpose of my invention is to provide an instrument of this class of superior efficiency and utility.

I carry out my invention as follows: Any suitable support is indicated at $a$. As shown, the support consists of a standard which may be engaged upon a suitable table, (indicated at $b$.) In the top of said support is journaled a tube, (indicated at $c$,) upon which is mounted a disk $d$, upon one face of which, as upon the rear face thereof, is a suitable scale, (indicated at $e$, Fig. 4,) the instrument being provided with an index-finger $f$, which may be mounted upon a portion of the support. The tube $c$ is revoluble within a stationary case $g$, secured to the support $a$, said tube being provided at its forward end with any suitable prismatic structure, (indicated at $h$.) The forward end of the case is constructed with an observation-orifice $i$ at the inner end of an eyepiece $j$. Forward of the prismatic structure $h$ the case is cut away, as indicated at $k$, to admit the insertion of testing-lenses, (indicated at $l$,) the rear face of the front end of the case adjacent to said opening being provided with a suitable scale, (indicated at $m$.) The tube $c$ is revoluble with the disk $d$. The prismatic structure $h$ is such that when an observer looks therethrough at a distant object, as a circle, (indicated at $n$ in Fig. 1,) said object will appear double to the eye of the beholder, the two visible forms of the object, as two circles, being adjacent one to the other, and in the normal eye the peripheries of the circles should contact the one with the other as the tube $c$ is rotated to cause the one circle to traverse about the periphery of the other circle. In the normal eye the two circles should contact at their peripheries around the entire circumference thereof. An abnormal condition of the eye will be indicated by the two circles separating or overlapping at different meridians, the abnormal positions of the circle being indicated by the scale $e$, while also the position of the lens $l$ may be indicated upon the scale $m$. I do not limit myself to a particular prismatic structure to be employed.

"Birefringent prisms" are indicated in Figs. 7 and 8; but any suitable prismatic structure can be employed within the scope of my invention and the same may be engaged with the tube $c$ in any suitable manner. By this construction it will be evident that the tube $c$ may readily be turned about as may be desired.

I prefer to bifurcate the support, as shown, to receive the disk $d$, the finger $f$ being mounted upon the rear bifurcated portion of the support. The disk $d$ is mounted upon the rear end of the tube $c$ and to the rear of the stationary case $g$.

What I claim as my invention is—

1. The combination of a support, an elongated revoluble tube journaled in said support and provided with a prismatic structure at its forward end, and a stationary case about the forward end of the tube, said case secured at its rear end to said support and having its forward end projecting beyond the forward end of said tube and provided with an observation-orifice in front of the tube through which an object may be viewed through the prismatic structure, the forward end of the case having a rigid connection with the body of the case and constructed with an opening to receive a testing-lens between the observation-orifice and the prismatic structure.

2. The combination of a support, an elongated revoluble tube journaled in said support and provided with a prismatic structure at its forward end, a stationary case about the forward end of the tube secured at its rear end to said support and having its forward end projecting beyond the forward end of said tube and provided with an observation-orifice through which an object may be viewed through the prismatic structure, the forward end of said case rigidly connected with the body of the case and constructed to receive a testing-lens between the observation-orifice and the prismatic structure, the face of the case in front of the prismatic structure provided with a scale.

3. The combination of a support, an elongated revoluble tube journaled in said support provided with a prismatic structure at its forward end, a disk mounted upon said tube toward the rear end thereof and revoluble therewith, a stationary case about the front end of the tube secured to said support and projecting beyond the forward end of said tube provided with an observation-orifice in front of the prismatic structure, said case constructed to receive a testing-lens between the observation-orifice and the prismatic structure, said disk provided with a scale, and an index-finger carried adjacent to said scale.

4. The combination of a support, an elongated tube journaled in said support provided with a prismatic structure at the forward end thereof, a stationary case engaged with the support above the forward end of said tube and projecting beyond the forward end of the tube and provided at its forward end with an observation-orifice for viewing an object through the prismatic structure, said case constructed to receive a testing-lens in front of the prismatic structure and provided with a scale in front of the prismatic structure, a disk mounted upon the tube toward the rear end thereof to the rear of said case provided with a scale and revoluble with said tube, and an index-finger mounted upon the support adjacent to said disk.

5. The combination of a support, an elongated revoluble tube provided with a prismatic structure at its forward end journaled in said support, a stationary case about the forward end of the tube secured to said support and projecting beyond the forward end of said tube, said case provided with an opening in front of the prismatic structure and with an observation-orifice in the end of the case in a line central to the prismatic structure, a disk mounted upon said tube toward the rear end thereof and to the rear of said case, said support bifurcated to receive said disk, the rear portion of the support provided with an index-finger.

In testimony whereof I have signed this specification in the presence of two subscribing witnesses.

GEO. JOHNSTON.

Witnesses:
N. S. WRIGHT,
M. M. STRUBLE.